(12) United States Patent
Jiao et al.

(10) Patent No.: US 8,131,292 B2
(45) Date of Patent: *Mar. 6, 2012

(54) METHOD AND APPARATUS FOR CDMA TIMER-BASED REGISTRATION ON A MOBILE DEVICE

(75) Inventors: Qingzhong Jiao, Ottawa (CA); Wen Zhao, Ottawa (CA)

(73) Assignee: Research In Motion Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,053

(22) Filed: Feb. 22, 2011

(65) Prior Publication Data

US 2011/0141977 A1    Jun. 16, 2011

Related U.S. Application Data

(63) Continuation of application No. 11/854,036, filed on Sep. 12, 2007, now Pat. No. 7,917,143, which is a continuation of application No. 11/113,154, filed on Apr. 25, 2005, now Pat. No. 7,283,819.

(51) Int. Cl.
*H04M 1/68* (2006.01)
(52) U.S. Cl. ..................... 455/435.1; 455/411
(58) Field of Classification Search ............... 455/435.1, 455/343
See application file for complete search history.

(56) References Cited

U.S. PATENT DOCUMENTS

| | | | |
|---|---|---|---|
| 4,972,355 A | 11/1990 | Mullins | |
| 5,588,043 A | 12/1996 | Tiedemann, Jr. et al. | |
| 6,385,448 B1 | 5/2002 | Beckman et al. | |
| 6,493,552 B1 | 12/2002 | Hicks | |
| 6,618,584 B1 | 9/2003 | Carneheim et al. | |
| 2002/0106997 A1 | 8/2002 | Barber et al. | |

FOREIGN PATENT DOCUMENTS

| | | |
|---|---|---|
| EP | 0472349 | 2/1992 |
| WO | 01/52589 | 7/2001 |

OTHER PUBLICATIONS

3GPP2 Upper Layer Signaling Standard for CDMA2000 Spread Spectrum Systems, Release 0, Jun. 15, 2000 (3GPP2 CS0005-0 Version 3.0), pp. 258-276.

*Primary Examiner* — Charles Shedrick
(74) *Attorney, Agent, or Firm* — Moffat & Co.

(57) ABSTRACT

A method and apparatus for improved timer based registration for a mobile device with a network, the network having a standard slot cycle time for interrupts, the method comprising the steps of: receiving, at the mobile device, a system parameter message from the network, the message having a value indicating a frequency for periodic registration; setting a timer value on a timer at the mobile device, the timer value being greater than the standard slot cycle time; setting a counter to count expiration of the timer; starting the timer; upon expiration of the timer, decrementing the counter; upon the counter reaching zero, waiting for a paging slot to communicate with the network; and sending a registration message to the network on the paging slot.

14 Claims, 4 Drawing Sheets

METHOD AND APPARATUS FOR CDMA TIMER-BASED REGISTRATION ON A MOBILE DEVICE

RELATED APPLICATIONS

The present application is a continuation of U.S. patent application Ser. No. 11/854,036, entitled "Method and Apparatus for CDMA Timer Based Registration on a Mobile Device" filed Sep. 12, 2007, which is a continuation of U.S. Pat. No. 7,283,819, filed Apr. 25, 2005 and issued Oct. 16, 2007. The full disclosures, including the drawings, of U.S. patent application Ser. No. 11/854,036 and U.S. Pat. No. 7,283,819 are incorporated herein by reference.

FIELD OF THE APPLICATION

The present application relates to timer-based registration for a mobile device in a CDMA network, and more specifically to a method and apparatus for the reduction of the number of interrupts currently required in order to maintain registration on a CDMA network.

BACKGROUND

In the current "Upper Layer (Layer 3) Signalling Standard for CDMA2000 Spread Spectrum Systems, Release 0" (3GPP2 CS0005-0 Version 3.0), section 2.6.5.1.3, the contents of which are incorporated herein by reference, specifies that a mobile station must increment a timer-based registration counter once every 80 ms whenever a variable entitled COUNTER_ENABLED is set to YES. If the mobile station is operating in slotted mode, it can increment the timer-based registration counter when it begins to monitor the Paging Channel and it should increment its counter as if it was in non-slotted mode.

The same standard requires that the registration period be calculated with the formula $T=2^{PRO/4} \times 80$ ms where PRD is in the range of 29 to 85. At the longest period for re-registration, the above standard therefore requires that a mobile station needs more than 2.4 million interrupts before the mobile performs a registration. At the shortest time period the number of interrupts required is 152.

When a mobile enters a slotted mode, the mobile is supposed to be relieved from the above burden since there should be no interrupts during the sleep period because the CPU is shut down. However, in reality, this is still unworkable. Many mobile devices include PDA and game functionality and thus the CPU is still busy while the CDMA is sleeping. The number of interrupts affects both the battery life and performance of the CPU and a solution is therefore required that would reduce the number of interrupts on the CPU.

BRIEF DESCRIPTION OF THE DRAWINGS

The present application will be better understood with reference to the drawings in which.

DETAILED DESCRIPTION

Figure 1:
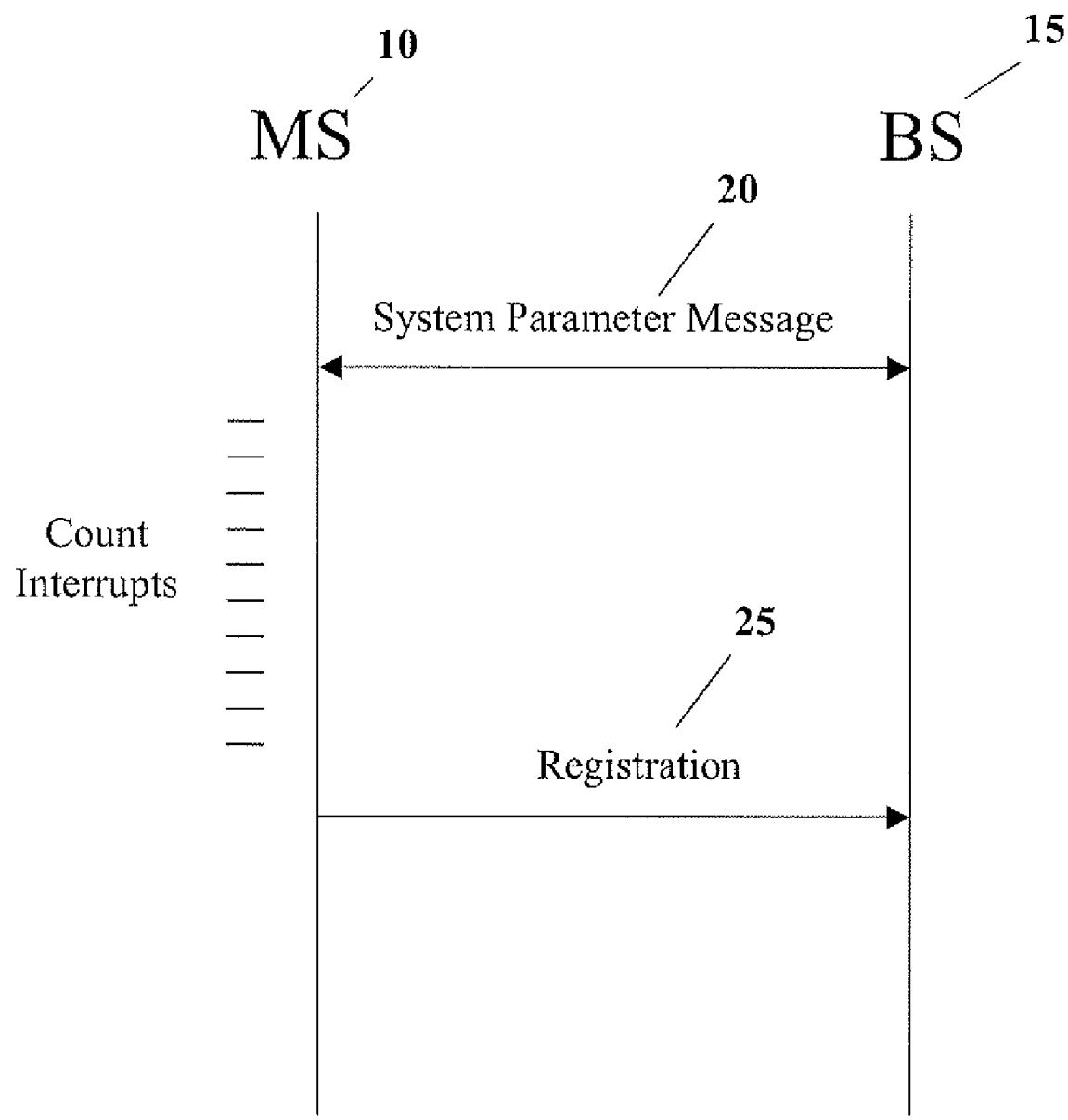
FIG. 1 shows a solution for periodic registration of the mobile station with a base station.

The present method and apparatus provide for a timer, preferably in hardware, that takes the place of the interrupts. The timer is set upon receipt of a system parameter message which conveys the need for timer-based registration and the frequency of the timer-based registration. Once the mobile station sends a registration message to the base station, the timer is reset and is allowed to run for its duration.

In a preferred embodiment, the timer value is set to be a multiple of the standard value. Thus, for example, in the present standard which requires 80 ms interrupts, the timer could be set to a multiple of 80 ms. In a preferred embodiment, the timer value is set for the minimum time period that re-registration can occur, or in the case of the above specifications, 152×80 ms. One skilled in the art will realize that not all timer values with be divisible by the base value and the present method and system therefore contemplates the ability to set the timer to a remainder value when the timer is initiated for a final time before registration. Thus, for example, if PRD is set to 34, T becomes 362. A timer could be run twice using a 152*80 ms cycle, sending an interrupt after each cycle, and then could be run for the remainder (362−2*152) or 58*80 ms. The number of interrupts would be three in this case. In another embodiment, the reminder of the timer is set to 80 ms cycle. There would be total of (2+58) interrupts in this case. Compared to 362 interrupts in the prior art, the number of interrupts is reduced in both cases.

The timer is preferably implemented in the hardware and thus does not need to interrupt the CPU until expiration of the timer. The CPU can store the value received from the system parameter message for the frequency re-registration and a software counter could be implemented to count down every time the timer expires and set a remainder value for the timer for the last cycle prior to the registration message being sent. This would, as would be appreciated by those skilled in the art, reduce the number of interrupts received at the CPU significantly and thus allow the performance of the CPU to be optimized.

In a further preferred embodiment, once the timer has expired, the mobile station next waits for the closest paging slot to become available and sends the registration message on this next paging slot. Since the timer expiry should be close to a multiple of 80 ms, it should occur near the start of the paging slot.

The present application therefore provides a method for improved timer based registration for a mobile device with a network, the network having a standard slot cycle time for interrupts, the method comprising the steps of: receiving, at the mobile device, a system parameter message from the network, the message having a value indicating a frequency for periodic registration; setting a timer value on a timer at the mobile device, the timer value being greater than the standard slot cycle time; setting a counter to count expiration of the timer; starting the timer; upon expiration of the timer, decrementing the counter; upon the counter reaching zero, waiting for a paging slot to communicate with the network; and sending a registration message to the network on the paging slot.

The present application further provides a mobile device having improved timer based registration with a network having paging slots, the network requiring a standard cycle time for interrupts, the mobile device comprising: a receiver for receiving a system parameter message from the network, the message having a value indicating a frequency for periodic registration; a timer having a settable timer value; means for setting the timer value to a value greater than the standard cycle time; a counter to count expiration of the timer; and a transmitter for sending a registration message to the network, wherein the mobile device sets the timer and counter based on the value indicating the frequency for periodic registration, starts the timer, decrements the counter when the timer reaches zero, waits for the next paging slot when the counter reaches zero and sends the registration message in the paging slot.

The present apparatus and method is discussed below with regard to a CDMA network. This is, however, not meant to be limiting and the present method and apparatus could be used with any broadcast paging system requiring periodic registration. CDMA is used merely as an exemplary system.

Reference is made to FIG. 1. FIG. 1 shows a solution for the registration of messages. As will be appreciated by those skilled in the art, a mobile station needs to periodically register with a base station to let the base station know that the mobile station is still within the network. According to CDMA standards, the registrations needs to occur within a window that is currently set between approximately 12 seconds to 15 days.

On power-up, mobile station 10 receives, from base station 15, a system parameter message 20 that includes the requirement that the mobile station used timer-based registration and further includes the frequency of this timer-based registration. The mobile station 10 notes this frequency and sets a counter. The mobile station also sets a timer to interrupt the CPU at a defined frequency. Currently, the specification requires that an interrupt be sent every 80 ms.

The mobile station 10 counts the interrupts and once the required number of interrupts occurs, the mobile station sends a registration message 25 to base station 15, resets the counter and starts counting the number of interrupts again until the next registration message needs to be sent.

As indicated above, having an interrupt every 80 ms may be fine on an idle mobile station in a non-slotted mode if the mobile station is only used for communications. However, today many mobile stations are also used for alternative purposes, including personal digital systems (PDAs), games or many other features that are performed without communication occurring. The 80 ms interrupt interferes with the performance of these non-communication functions on the mobile station and are thus undesirable.

Figure 2:
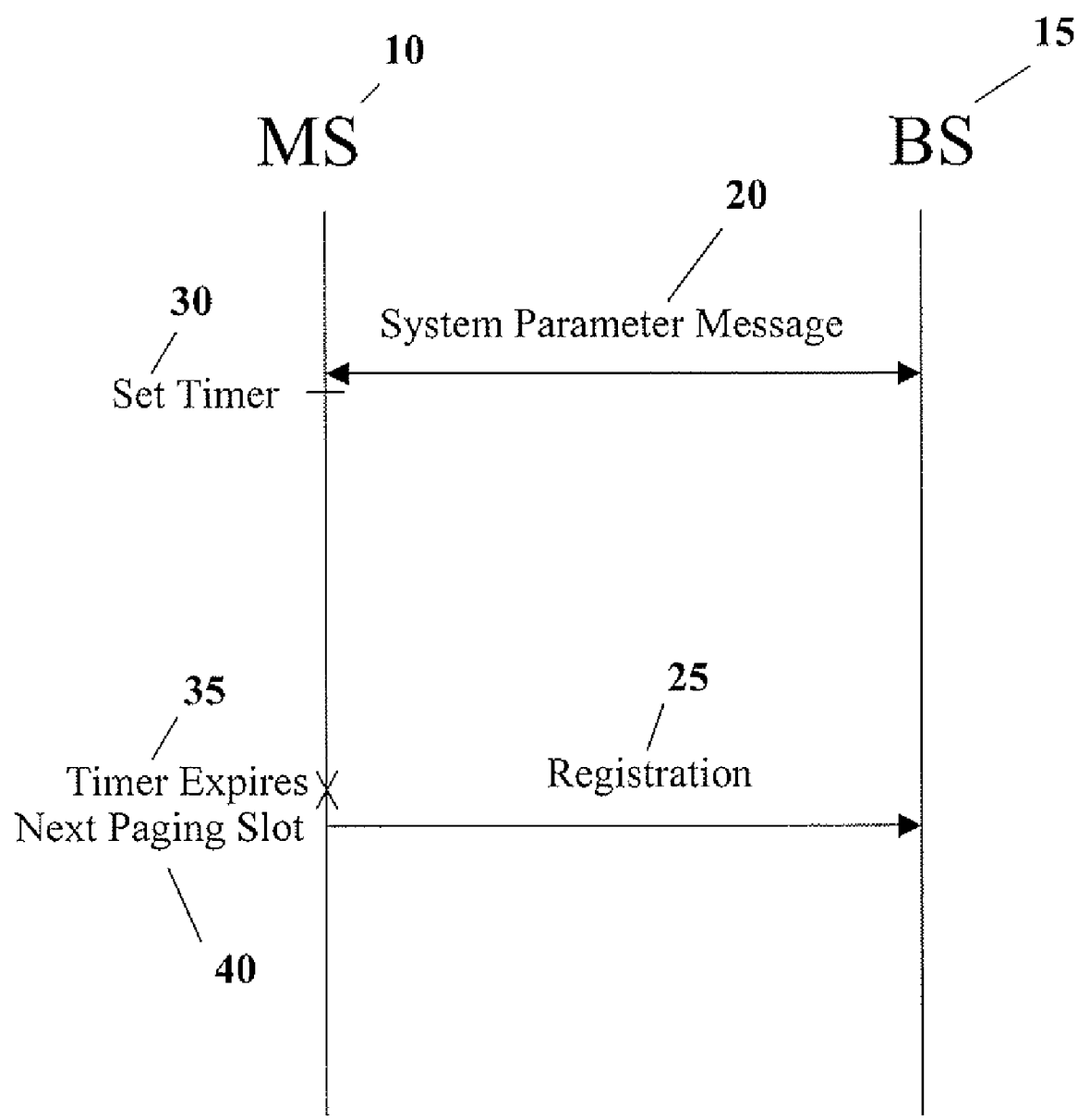
FIG. 2 shows signalling between a mobile station and a base station according to the method and apparatus of the present application.

Reference is made to FIG. 2. According to one aspect of the present method and apparatus, when a mobile station 10 receives system parameter message 20 from base station 15, a timer 30 can be set. Timer 30 is preferably a hardware implemented timer which would not require CPU time. In a preferred embodiment, timer 30 expires in a period that is a multiple of the interrupt period defined for the broadcast paging system. In other words, using the numbers from above, the timer value should be set to a multiple of 80 ms. This will result in the timer expiring close to the paging slot for the mobile station. The mobile station 10, upon timer expiry 35, can then wait for the next paging slot 40 and upon the paging slot starting, it can send a registration message 25 to base station 15.

In a preferred embodiment, the timer value expires close to the paging slot required for the next registration. However, if registration occurs infrequently, then it may be impossible to set the timer value to a large enough number in order to accommodate this infrequent registration. In this case, upon timer expiry, an interrupt could be sent to the CPU which could include an interrupt counter as in the prior art and the interrupt counter could count down until the registration message needs to be resent. However, contrary to the prior art, the resolution of the interrupts in the present case is much more infrequent, thereby allowing CPU functionality to be only minimally affected.

For example, if the timer value needs to be within a two-word resolution, this might mean that the maximum timer value could be set to 15 hours depending on the frequency of the crystal used in the timer incrementation. Thus, if the registration period is 45 hours, a CPU could have an interrupt counter set to 3 and if the timer expired three times, the registration message would be sent. This would be contrary to the over 2 million interrupts sent to the CPU in the prior art.

Alternatively, even if the timer expiry is set to the minimum registration frequency allowed, for example in the above case 152×80 ms, or 12.16 seconds, this would still only be 13,300 interrupts compared with the over 2 million interrupts. Again, CPU performance would not be greatly reduced by this number of interrupts. Further, battery would also be saved by having less interrupts at the CPU.

As will be appreciated by those skilled in the art, in order to come close to the start of a paging channel slot for registration the timer will need to be able to accommodate a remainder value for the final iteration of timer, since not all values for registration are divisible by the minimum registration frequency. As outlined above, if the system parameter message requires re-registration to occur where PRD is set to 34, then according to the formula $T=2^{PRD/4}*80$ ms, re-registration should occur every 362*80 ms. If the timer is set to 152*80 ms then a timer counter will need to be set to 2 to count down the expiration of the time. The timer would then need to be set to the remainder, or 362−2*152=58 iterations, or 58*80 ms in duration. Upon expiration of the remainder count a re-registration message can be sent immediately or in the next paging slot.

Other methods are also available to implement the above. The counter could be set to the value of the re-registration period divided by the minimum re-registration frequency, and rounded up to the next integer value. Then, when the counter is 1 the timer could be set to the remainder. Other methods of implanting the above would also be known.

Figure 3:
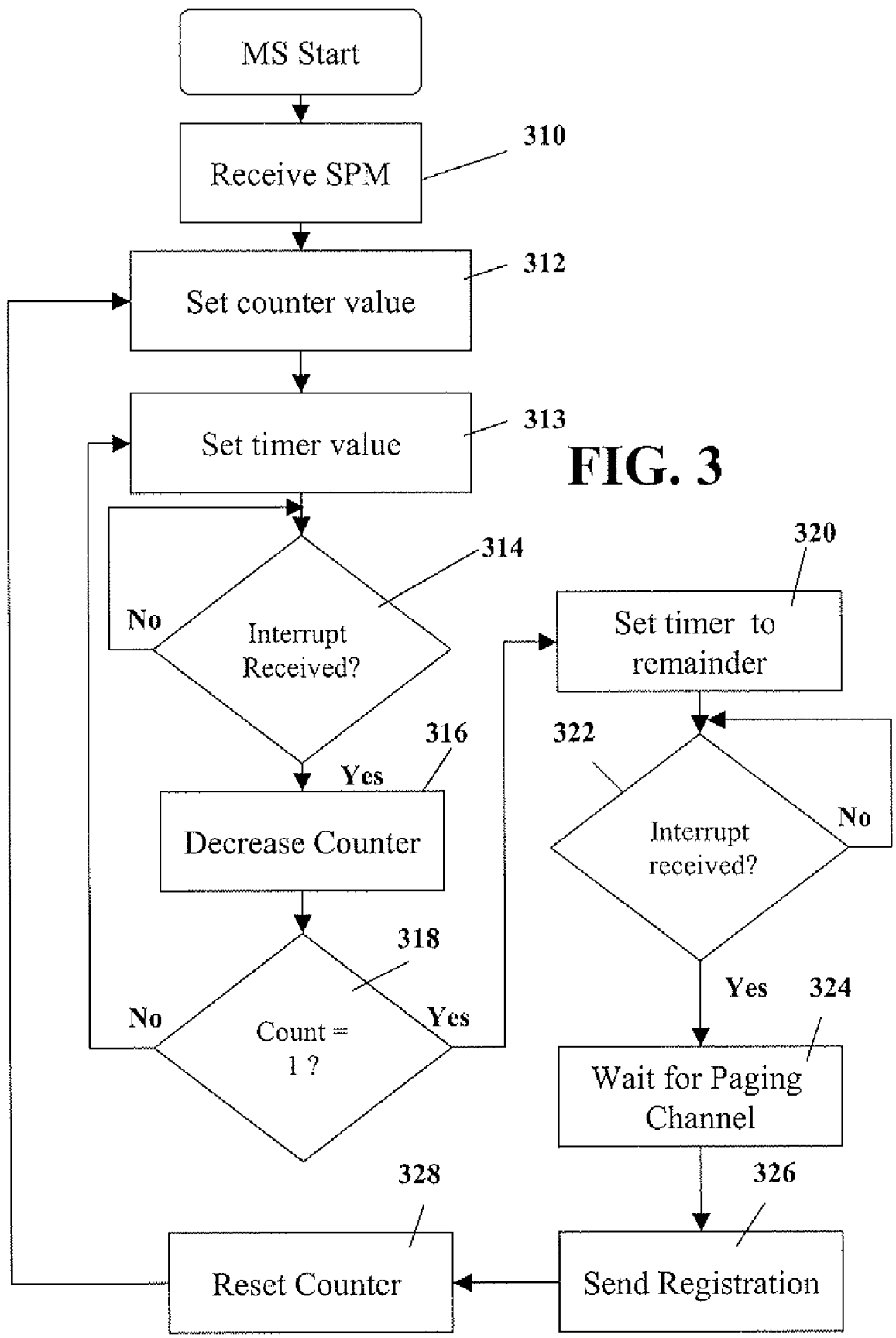
FIG. 3 shows a flow chart of an exemplary registration scenario according to the present application.

Reference is now made to FIG. 3. FIG. 3 shows an exemplary method according to the present application. As seen in FIG. 3, when a mobile station 10 starts up, it receives a system parameter message (SPM) which includes the frequency that the mobile station needs to register with the base station. This is received at step 310. The mobile station next proceeds to step 312 in which a counter is set and step 313 in which a timer is set. As indicated above, the defined interrupt cycle in the present CDMA networks is set to 80 ms and the timer could be set to a multiple of this cycle. In one embodiment the multiple could be the minimum registration period. This could be, for example, the minimum 152×80 ms periods, or 12.16 seconds. Thus the counter could be set to a multiple of 12.16 seconds to achieve the frequency received at the system parameter message in step 310. In one embodiment, the counter could be set to the frequency received at step 310 divided by the cycle multiple, and rounded up or down to the nearest integer. If rounded down, the timer could be set to a remainder value as defined below when the counter reaches 0, or if rounded up the timer could be set to a remainder value when the counter reaches 1.

Mobile station next proceeds to step 314 in which the CPU is waiting for an interrupt. As will be appreciated by one skilled in the art, the CPU does not really wait for an interrupt but for illustrative purposes, FIG. 3 shows a waiting process. An interrupt has not been received, the mobile station stays at step 314. Once an interrupt has been received, mobile station 10 proceeds to step 316 in which the counter set in step 312 is decremented. In step 318, the mobile station checks whether the counter has expired, in which case the mobile station sends a registration message to the base station at step 326 and then resets the counter to its previous value in step 328. After step 328, the mobile station goes back to step 312 and waits for interrupts to decrement the counter again in steps 314 and 316.

The illustration of FIG. 3 shows the mobile device in step 318 checking to see whether the counter has reached 1. This assumes that the counter value was rounded up to the next nearest integer when the division between the re-registration period and the cycle multiple was performed. As indicated above, this could be a value of zero if the integer was calculated by rounding down.

If in step 318 the counter has not yet reached one, then the mobile station proceeds back to step 313 in which the timer is set and step 314 in which the mobile station waits for an interrupt in order to continue to decrement the counter.

If in step 318 the counter is found to be 1, the mobile station proceeds to step 320 in which the timer value is set to the remainder of the re-registration period. The mobile station next proceeds to step 322 in which it waits for an interrupt signaling that the timer has expired. This will indicate that the mobile station should proceed to steps 324 and 326 to send the re-registration message in the next paging channel slot.

As will be appreciated by those skilled in the art, the diagram of FIG. 3 could be simplified if the mobile station knows the timer length and this timer length is not longer than a timer could be set to. For example, if the registration is to occur every 15 minutes, the counter could be set to a 15 minute counter in which case steps 316 and 318 are not required and the only time an interrupt occurs is when the timer expires, indicating that a registration should be sent in step 326 and the mobile station then waits for the expiration of the next time in order to again send that registration message.

In a preferred embodiment, mobile station 10 waits for a paging channel in step 324 prior to sending registration 326. Since the timer does not necessarily expire at the start of a paging channel slot, the mobile station should wait for this paging channel slot in the preferred embodiment.

The above therefore describes a method and apparatus in which the number of interrupts sent to a CPU is greatly reduced in order to ensure the CPU performance. Upon receipt of the frequency of the registration, a timer can be set. In a preferred embodiment, the timer could be set to a multiple of a predefined cycle to maintain synchronization with the network and with a final setting to a remainder value, provide the expiration of a timer close to the start of a paging channel slot.

Figure 4:
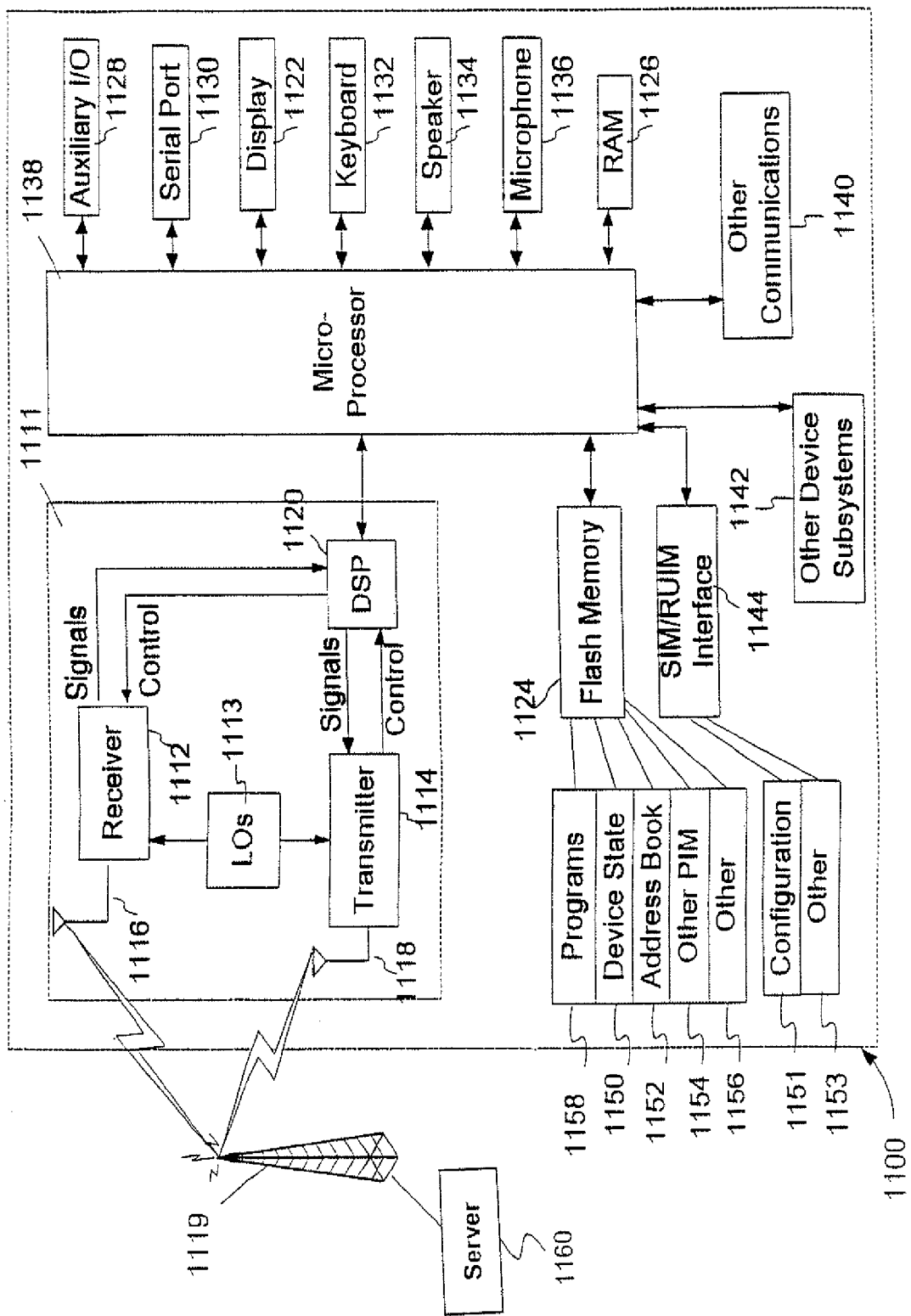
FIG. 4 is a block diagram of an exemplary mobile device that could be used with the present application.

One skilled in the art will appreciate that many mobile stations could be used to implement the above. FIG. 4 illustrates an exemplary mobile station that could be used with the above method. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/ output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 4 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 4 would normally be implemented in a personal digital assistant (PDA)-type mobile station for which synchronization with a user's desktop computer (not shown) may be desirable. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for registration of a mobile device with a network having a standard cycle time requirement for interrupts and a registration period, the method comprising the steps of:
   a) setting a timer value on a timer at the mobile device, the timer value being a multiple of the standard cycle time and greater than the standard cycle time;
   b) upon expiration of the timer, if the registration period minus a time elapsed since a previous registration message was sent is greater than the timer value, proceeding back to the setting step; and
   c) sending a registration message from the mobile device to the network.

2. The method of claim 1, wherein the multiple of the standard cycle time represents the shortest registration time allowed in the network.

3. The method of claim 1, wherein the network is a CDMA network.

4. The method of claim 1, wherein the timer is implemented in hardware.

5. The method of claim 1, further comprising the steps of repeating the setting step after the sending step.

6. The method of claim 1, wherein the expiration of the timer causes an interrupt to be sent to a processor on the mobile device.

7. The method of claim 6, wherein the processor counts the interrupts to determine the time elapsed since the previous registration message was sent.

8. A mobile device configured to register with a network having a standard cycle time requirement for interrupts and a registration period, the mobile device comprising:
   a processor;
   a timer;
   a communications subsystem comprising a transmitter and a receiver; and
   wherein the processor, timer, and communications subsystem cooperate to:
   a) set a timer value on the timer, the timer value being a multiple of the standard cycle time and greater than the standard cycle time;
   b) upon expiration of the timer, if the registration period minus a time elapsed since a previous registration message was sent is greater than the timer value, proceed back to set the tinier; and
   c) send a registration message to the network.

9. The mobile device of claim 8, wherein the multiple of the cycle time represents the shortest registration time allowed in the network.

10. The mobile device of claim 8, wherein the network is a CDMA network.

11. The mobile device of claim 8, wherein the timer is implemented in hardware.

12. The mobile device of claim 8, wherein the processor, timer and communications subsystem further cooperate to repeat the setting of the timer after the sending.

13. The mobile device of claim 8, wherein the expiration of the timer causes an interrupt to be sent to the processor.

14. The mobile device of claim 13, wherein the processor is configured to count the interrupts to determine the time elapsed since the previous registration message was sent.

\* \* \* \* \*